United States Patent Office 3,257,474
Patented June 21, 1966

3,257,474
PROCESS FOR THE OXIDATIVE DEHYDROGENA-
TION OF OLEFINS USING AN ANTIMONY OX-
IDE-MANGANESE OXIDE CATALYST
James L. Callahan, Bedford, Ohio, Berthold Gertisser,
New York, N.Y., and Robert Grasselli, Cleveland,
Ohio, assignors to The Standard Oil Company, Cleve-
land, Ohio, a corporation of Ohio
No Drawing. Filed Oct. 15, 1962, Ser. No. 230,694
6 Claims. (Cl. 260—680)

This invention relates to the catalytic oxidative dehy-
drogenation of olefins to diolefins, such as butene-1 to
butadiene, and tertiary amylenes to isoprene, using an
improved oxidation catalyst consisting essentially of oxides
of the elements antimony and manganese.

U.S. Patent No. 2,904,580, dated September 15, 1959,
describes a catalyst composed of antimony oxide and
molybdenum oxide, as antimony molybdate, and indicates
its utility in converting propylene to acrylonitrile.

British Patent 864,666, published April 6, 1961, de-
scribes a catalyst composed of an antimony oxide alone
or in combination with a molybdenum oxide, a tungsten
oxide, a tellurium oxide, a copper oxide, a titanium oxide,
or a cobalt oxide. These catalysts are said to be either
mixtures of these oxides or oxygen-containing compounds
of antimony with the other metal; such as antimony
molybdate or molybdenum antimonate. These catalyst
systems are said to be useful in the production of unsatu-
rated aldehydes such as acrolein or methacrolein from
olefins such as propylene or isobutene and oxygen.

British Patent 876,446, published August 30, 1961, de-
scribes catalysts including antimony, oxygen and tin, and
said to be either mixtures of antimony oxides with tin
oxides, or oxygen-containing compounds of antimony and
tin such as tin antimonate. These catalysts are said to
be useful in the production of unsaturated aliphatic ni-
triles such as acrylonitrile from olefins such as propylene,
oxygen and ammonia.

I. THE CATALYST

In accordance with the invention, an oxidation catalyst
is provided consisting essentially of oxides of antimony
and manganese. This catalyst is useful not only in the
oxidation of olefins to oxygenated hydrocarbons such as
acrolein and the oxidation of olefin-ammonia mixtures to
unsaturated nitriles such as acrylonitrile, but also in the
catalytic oxidative dehydrogenation of olefins to diolefins.

The nature of the chemical compounds which compose
the catalyst of the invention is not known. The catalyst
may be a mixture of antimony oxide or oxides and man-
ganese oxide or oxides. It is also possible that the anti-
mony and manganese are combined with the oxygen to
form a manganese antimonate. X-ray examination of
the catalyst system has indicated the presence of a struc-
turally common phase of the antimony type, composed of
antimony oxide, and some form of manganese oxide. An-
timony tetroxide has been identified as present. For the
purposes of description of the invention, this catalyst sys-
tem will be referred to as a mixture of antimony and man-
ganese oxides, but this is not to be construed as meaning
that the catalyst is composed either in whole or in part of
these compounds.

The proportions of antimony and manganese in the
catalyst system may vary widely. The Sb:Mn atomic ratio
can range from about 1:50 to about 99:1. However,
optimum activity appears to be obtained at Sb:Mn atomic
ratios within the range of 1:1 to 25:1.

The catalyst can be employed without support, and
will display excellent activity. It also can be combined
with a support, and preferably at least 10% up to about
90% of the supporting compound by weight of the entire
composition is employed in this event. Any known sup-
port materials can be used, such as, for example, silica,
alumina, zirconia, Alundum, silicon carbide, alumina-
silica, and the inorganic phosphates, silicates, aluminates,
borates and carbonates stable under the reaction condi-
tions to be encountered in the use of the catalyst.

The antimony oxide and manganese oxide can be
blended together, or can be formed separately and then
blended, or formed separately or together in situ. As
starting materials for the antimony oxide component, for
example, there can be used any antimony oxide, such as
antimony trioxide, antimony tetraoxide and antimony
pentoxide, or mixtures thereof; or a hydrous antimony
oxide, metaantimonic acid, orthoantimonic acid or pyro-
antimonic acid; or a hydrolyzable or decomposable anti-
mony salt, such as an antimony halide, for example, anti-
mony trichloride, trifluoride or tribromide; antimony pen-
tachloride and antimony pentafluoride, which is hydrolyz-
able in water to form the hydrous oxide. Antimony
metal can be employed, the hydrous oxide being formed
by oxidizing the metal with an oxidizing acid such as
nitric acid.

The manganese oxide component can be provided in the
form of any manganese oxide, or by precipitation in situ
from a soluble manganese salt such as the nitrate, acetate,
or a halide such as the chloride. Manganese metal can
be used as a starting material, and if antimony metal is
also employed, the antimony can be converted to the oxide
and manganese to the nitrate simultaneously by oxidation
in hot nitric acid. A slurry of hydrous antimony oxide
formed in situ from the metal in nitric acid also can be
combined with a solution of a manganese salt such as man-
ganese nitrate, which is then precipitated in situ as a man-
ganese oxide by the addition of ammonium hydroxide.
The ammonium nitrate and any other soluble salts are
removed by filtration of the resulting slurry.

It will be apparent from the above that manganous
formate, manganous acetate, manganous dibromide, man-
ganous diiodide, manganous dichloride, manganic per-
chloride, manganic perbromide, manganous difluoride,
manganic trifluoride, manganous nitrate, manganous sul-
fate, manganic sulfate, manganous thiocyanate, man-
ganous dibasic phosphate, manganous ammonium-sulfate,
manganese (ous, ic) oxide, $Mn_3O_4$, manganous oxide,
manganous dioxide, manganic oxide, manganese hepta-
oxide, and manganese trioxide can be employed as the
source of the manganese oxide component.

The term "manganese" as used herein refers to manga-
ness in any of its valence states.

The catalytic activity of the system is enhanced by
heating at an elevated temperature. Preferably, the cata-
lyst mixture is dried and heated at a temperature of
from about 500 to about 1150° F., preferably at about
700 to 900° F., for from two to twenty-four hours. If
activity then is not sufficient, the catalyst can be fur-
ther heated at a temperature above about 1000° F., but
below a temperature deleterious to the catalyst at which
it is melted or decomposed, preferably from about
1400° F. to about 1900° F. for from one to forty-eight
hours, in the presence of air or oxygen. Usually this
limit is not reached before 2000° F. and in some cases
this temperature can be exceeded.

In general, the higher the activation temperature, the
less time required to effect activation. The sufficiency
of activation at any given set of conditions is ascertained
by a spot test of a sample of the material for catalytic
activity. Activation is best carried out in an open cham-
ber, permitting circulation of air or oxygen, so that any
oxygen consumed can be replaced.

The antimony oxide-manganese oxide catalyst compo-
sition of the invention can be defined by the following
empirical formula:

$$Sb_aMn_bO_c$$

where $a$ is 1 to 99, $b$ is 50 to 1, and $c$ is a number taken to satisfy the average valences of antimony and manganese in the oxidation states in which they exist in the catalyst as defined by the empirical formula above. Thus, the Sb valence may range from 3 to 5 and the Mn valance from 2 to 7.

II. THE OXIDATIVE DEHYDROGENATION OF OLEFINS TO DIOLEFINS AND AROMATICS

In accordance with the present invention, this catalyst system is employed in the catalytic oxidative dehydrogenation of olefins to diolefins and aromatics. In this process, the feed stream in vapor form containing the olefin to be dehydrogenated and oxygen is conducted over the catalyst at a comparatively low temperature to obtain the corresponding diolefin or aromatic compound.

By the term "olefin" as used herein is meant the open chain as well as cyclic olefins. The olefins dehydrogenated in accordance with the invention have at least four and up to about eight nonquaternary carbon atoms, of which at least four are arranged in series in a straight chain or ring. The olefins preferably are either normal straight chain or tertiary olefins. Both cis and trans isomers, where they exist, can be dehydrogenated.

Among the many olefinic compounds which can be dehydrogenated in this way are butene-1, butene-2, pentene-1, pentene-2, tertiary pentenes and hexenes having one tertiary carbon atom such as 2-methyl-pentene-1, 3-methylbutene-1 and 2-methyl-butene-2, hexene-1, hexene-2, 4-methyl-pentene-1, 3,4-dimethylpentene-1, 4-methyl-pentene-2, heptene-1, octene-1, cyclopentene, cyclohexene, 3-methyl cyclohexene, and cycloheptene.

Open chain olefins yield diolefins, and in general, six-membered ring olefins yield aromatic ring compounds. The higher molecular weight open chain olefins may cyclize to aromatic ring compounds.

The feed stock in addition to the olefin and oxygen can contain one or more paraffinic or naphthenic hydrocarbons having up to about ten carbon atoms, which may be present as impurities in some petroleum hydrocarbon stocks and which may also be dehydrogenated in some cases. Propylene and isobutylene should not be included in substantial amounts.

The amount of oxygen should be within the range from about 0.3 to about 3 moles per mole of olefin. Stoichiometrically, 0.5 to 1.5 moles of oxygen per mole of olefin is required for the dehydrogenation to diolefins and aromatics, respectively. It is preferred to employ an excess, from 1 to about 2 moles per mole of olefin, in order to ensure a higher yield of diofein per pass. The oxygen can be supplied as pure or substantially pure oxygen or as air or in the form of hydrogen peroxide.

When pure oxygen is used, it may be desirable to incorporate a diluent in the mixture, such as steam, carbon dioxide, or nitrogen.

The feed stock is preferably catalytically dehydrogenated in the presence of steam, but this is not essential. Usually, from about 0.1 to about 6 moles of steam per mole of olefin reactant is employed, but amounts larger than this can be used.

The dehydrogenation proceeds at temperatures within the range from about 325° C. to about 1000° C. Optimum yields are obtainable at temperatures within the range from about 400 to about 550° C. However, since the reaction is exothermic, temperatures in excess of 550° C. should not be used, unless means is provided to carry off the heat liberated in the course of the reaction. Due to the exothermic nature of the reaction, the temperature of the gaseous reaction mixture will be higher than the temperature of the feed entering the system by as much as 75° C. The temperatures referred to are those of the entering gas feed near the reactor inlet.

The preferred reaction pressure is approximately atmospheric, within the range from about 5 to about 75 p.s.i.a. Higher pressures up to about 300 p.s.i.a. can be used and have the advantage of simplifying the product recovery.

Only a brief contact time with the catalyst is required for effective dehydrogenation. The apparent contact time with the catalyst can range from about 0.5 to about 50 seconds but higher contact times can be used if desired. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture. At these contact times, comparatively small reactors and small amounts of catalyst can be used effectively.

The catalyst can be supplied in the form of tablets or pellets suitable for use in a fixed bed, with or without a support, maintained at the reaction temperature, passing the feed vapors through the bed. In this method of operation, the partial pressure of oxygen is high at the inlet and low at the outlet. The concentration of diolefin, on the other hand, is substantially zero at the inlet and at a maximum at the outlet.

The catalyst can also be provided in the form of a "fluidized" bed employing the catalyst in powdered form.

The reactor may be brought to the reaction temperature before or after the introduction of the vapors to be reacted. In a large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The effluent from the reaction zone can be quenched, but normally this is not required, inasmuch as there is little tendency for side reactions to take place, particularly at the preferred temperature range. The effluent can then be washed with dilute caustic to neutralize any acids present, and remove the steam. If air is used as a source of oxygen, the effluent is then compressed and scrubbed with oil to separate the hydrocarbons from the nitrogen, carbon dioxide and carbon monoxide. The hydrocarbons may then be stripped from the oil, and subjected to an extractive distillation or a copper ammonia acetate treatment to separate and recover the diolefin. Unreacted olefin can be recycled to the reactor.

The following examples in the opinion of the inventors represent preferred embodiments of the process of oxidative dehydrogenation of olefins in accordance with the invention.

Examples 1 and 2

A catalyst system composed of antimony oxides and manganese oxides with an Sb:Mn atomic ratio of 1.35 to 1 was prepared as follows. 45 g. of antimony metal (less than 270 mesh) was oxidized in 186 cc. of concentrated nitric acid sp. gr. 1.42, by heating until all of the red oxides of nitrogen had been driven off. To this suspension of antimony oxides was then added 98 g. of a 50% water solution of manganous nitrate. The slurry was diluted with 150 cc. of 28% ammonium hydroxide. The slurry was filtered, and the filter cake washed with three 100 cc. portions of water. The catalyst was dried overnight in an oven at 120° C., calcined at 1000° F. overnight and then activated by heating overnight at 1400° F. in a muffle furnace open to the atmosphere.

The activity of this catalyst in the oxidative dehydrogenation of butene-1 to butadiene was determined using a micro-scale reactor having a capacity of approximately 5 ml. of catalyst charge in a fixed bed. The feed gases were metered by Rotameters. In the tests, a catalyst charge of 5 ml. was used. The feed molar ratio of butene/air is given in Table I below. The reaction was carried out at the temperature and contact times given in the table.

The percent conversion to diolefins in the table is expressed as:

Conversion percent to diolefin per pass
$$= 100 \times \frac{\text{Moles of diolefin recovered}}{\text{moles of olefin fed}}$$

TABLE I

| Example No. | Butene | Feed Ratio, Butene/Air Vol. Ratio (Molar) | Apparent Contact Time (seconds) | Temperature (° F.) | Percent Conversion |
|---|---|---|---|---|---|
| 1 | Butene-1 | 1 | 6 | 5 | 880 | 36.1 |
| 2 | Butene-2 | 1 | 6 | 10 | 880 | 30.1 |

When Example 1 is repeated except that the addition of manganese to the catalyst is omitted, so that the catalyst is essentially antimony oxide, the conversion is about 20%. It is apparent that quite useful per pass conversions of butene to butadiene were obtained in each run. Only traces of acids and aldehyde were formed.

We claim:

1. The process for the oxdative dehydrogenation of olefins to diolefins which comprises contacting a mixture of oxygen and an olefin having at least four up to about eight nonquaternary carbon atoms, of which at least four are arranged in a series, in the vapor phase at a temperature at which the oxidative dehydrogenation proceeds with a catalyst consisting essentially of an active catalytic oxide complex of antimony and maganese, the Sb:Mn atomic ratio being within the range from about 1:50 to about 99:1, said complex being formed by heating the mixed oxides of antimony and manganese in the presence of oxygen at an elevated temperature of above 500° F. but below their melting point for a time sufficient to form said active catalytic oxide complex of antimony and manganese.

2. The process in accordance with claim 1, wherein the catalyst has an Sb:Mn atomic ratio of from 1:1 to 25:1.

3. The process in accordance with claim 1, in which the reaction is carried out at a temperature within the range from about 325 to about 1000° C.

4. The process in accordance with claim 1, in which the olefin has from about four to about eight carbon atoms in a straight chain.

5. The process in accordance with claim 1, in which the proportion of oxygen in the feed is maintained at from 0.3 to 3 moles per mole of olefin.

6. The process in accordance with claim 1, wherein the olefin is a butene.

References Cited by the Examiner

UNITED STATES PATENTS 1,975,476  10/1934  Pier et al. _____ 252—456
2,326,258   8/1943  Schmidt et al. _____ 260—680

FOREIGN PATENTS 1,248,370  10/1960  France.

PAUL M. COUGHLAN, *Primary Examiner.*

ALPHONSO D. SULLIVAN, *Examiner.*